United States Patent
Maimone et al.

(10) Patent No.: US 10,120,337 B2
(45) Date of Patent: Nov. 6, 2018

(54) ADJUSTABLE SCANNED BEAM PROJECTOR

(71) Applicant: Microsoft Technology Licensing, LLC, Redmond, WA (US)

(72) Inventors: Andrew Maimone, Duvall, WA (US); Joel S. Kollin, Seattle, WA (US); Joshua Owen Miller, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 186 days.

(21) Appl. No.: 15/344,130

(22) Filed: Nov. 4, 2016

(65) Prior Publication Data

US 2018/0129167 A1   May 10, 2018

(51) Int. Cl.
*G03H 1/26* (2006.01)
*G03H 1/22* (2006.01)
(Continued)

(52) U.S. Cl.
CPC ....... *G03H 1/2645* (2013.01); *G02B 27/0025* (2013.01); *G02B 27/0172* (2013.01); *G03H 1/0248* (2013.01); *G03H 1/2286* (2013.01); *G03H 1/265* (2013.01); *G03H 1/28* (2013.01); *G06F 3/013* (2013.01);
(Continued)

(58) Field of Classification Search
CPC .... G11B 7/0065; G11B 7/00772; G02B 5/00; G02B 27/01; G02B 27/017; G02B 6/00; G02B 27/0172; G02B 5/32; G02B 26/00; G03H 1/22; G03H 1/26; G03H 1/04;
(Continued)

(56) References Cited

U.S. PATENT DOCUMENTS 5,416,616 A   5/1995  Jenkins et al.
5,680,231 A   10/1997 Grinberg et al.
(Continued)

FOREIGN PATENT DOCUMENTS

CN   105487244 A   4/2016
WO   2013093510 A2   6/2013

OTHER PUBLICATIONS

Schowengerdt, et al., "3D Displays using Scanning Laser Projection", in Journal of SID Symposium Digest of Technical Papers, vol. 43, Issue 1, Jun. 2012, 3 pages.
(Continued)

*Primary Examiner* — William R Alexander
*Assistant Examiner* — Tamara Y Washington
(74) *Attorney, Agent, or Firm* — Alleman Hall Creasman & Tuttle LLP (57) ABSTRACT

Examples are disclosed herein relating to an adjustable scanning system configured to adjust light from an illumination source on a per-pixel basis. One example provides an optical system including an array of light sources, a holographic light processing stage comprising, for each light source in the array, one or more holograms configured to receive light from the light source and diffract the light, the one or more holograms being selective for a property of the light that varies based upon the light source from which the light is received, and a scanning optical element configured to receive and scan the light from the holographic light processing stage.

20 Claims, 6 Drawing Sheets

(51) Int. Cl.
*G02B 27/00* (2006.01)
*G03H 1/02* (2006.01)
*G03H 1/28* (2006.01)
*G02B 27/01* (2006.01)
*G06F 3/01* (2006.01)

(52) U.S. Cl.
CPC ............ *G02B 2027/0174* (2013.01); *G03H 2001/2292* (2013.01); *G03H 2001/266* (2013.01); *G03H 2001/2615* (2013.01); *G03H 2222/34* (2013.01); *G03H 2222/36* (2013.01); *G03H 2223/17* (2013.01); *G03H 2223/22* (2013.01)

(58) Field of Classification Search
CPC ............ G03H 2210/00; G03H 1/2286; G03H 1/0005; G03H 2225/00; G03H 2001/2292
USPC ...................................................... 359/1–35
See application file for complete search history.

(56) References Cited

U.S. PATENT DOCUMENTS

| | | | | |
|---|---|---|---|---|
| 6,037,914 | A * | 3/2000 | Robinson | G02B 27/0101 345/7 |
| 6,417,969 | B1 * | 7/2002 | DeLuca | G02B 27/2235 359/630 |
| 7,639,208 | B1 * | 12/2009 | Ha | G02B 27/0172 345/204 |
| 8,403,490 | B2 | 3/2013 | Sugiyama et al. | |
| 8,625,184 | B2 | 1/2014 | Kawano et al. | |
| 8,736,963 | B2 * | 5/2014 | Robbins | G02B 27/144 359/629 |
| 8,885,112 | B2 * | 11/2014 | Popovich | G02B 5/1819 349/11 |
| 9,368,546 | B2 | 6/2016 | Fleck et al. | |
| 9,417,608 | B2 | 8/2016 | Yu | |
| 2005/0248820 | A1 | 11/2005 | Moser et al. | |
| 2006/0028400 | A1 * | 2/2006 | Lapstun | G02B 26/06 345/8 |
| 2007/0002716 | A1 * | 1/2007 | Shindo | G11B 7/1353 369/112.16 |
| 2011/0007277 | A1 * | 1/2011 | Solomon | G02B 26/105 353/7 |
| 2012/0127284 | A1 * | 5/2012 | Bar-Zeev | G02B 27/017 348/53 |
| 2012/0218301 | A1 * | 8/2012 | Miller | G02B 27/017 345/633 |
| 2013/0141434 | A1 * | 6/2013 | Sugden | G02B 27/017 345/426 |
| 2013/0222384 | A1 | 8/2013 | Futterer | |
| 2013/0285885 | A1 | 10/2013 | Nowatzyk et al. | |
| 2013/0286053 | A1 * | 10/2013 | Fleck | G09G 3/3208 345/690 |
| 2014/0140654 | A1 * | 5/2014 | Brown | G02F 1/29 385/10 |
| 2014/0168735 | A1 | 6/2014 | Yuan et al. | |
| 2014/0313189 | A1 * | 10/2014 | Dominici | G06T 19/006 345/419 |
| 2014/0340390 | A1 * | 11/2014 | Lanman | G06T 15/04 345/419 |
| 2016/0033771 | A1 | 2/2016 | Trembley et al. | |

OTHER PUBLICATIONS

Schowengerdt, et al., "Volumetric Display using Scanned Fiber Array", in Journal of SID Symposium Digest of Technical Papers, vol. 41, Issue 1, May 2010.
Varioptic. Electrowetting Variable Lens. Retrieved on Sep. 15, 2016 Available at: http://www.varioptic.com/.
Deep Optics. Liquid Crystal Variable Lens. Retrieved on Sep. 15, 2016 Available at: http://www.deepoptics.com/do_site/.
eVision. Liquid Crystal Variable Lens. Retrieved on Sep. 15, 2016 Available at: http://www.evisionoptics.com/spectacle.html.
PoLight. Piezo-electric Actuated Variable Lenses. Retrieved on Sep. 15, 2016 Available at: http://polight.com/.
Opto-tune. Polymer Actuated Variable Lenses. Retrieved on Sep. 15, 2016 Available at: http://www.optotune.com/technology/focus-tunable-lenses.

* cited by examiner

ADJUSTABLE SCANNED BEAM PROJECTOR

BACKGROUND

A scanning projection system includes a light source and a scanning stage to scan light from the light source. The amplitude of the projected light may be controlled at each scanned pixel to produce a viewable image.

SUMMARY

Examples are disclosed that relate to a scanning projection system that allows projected light characteristics to be adjusted on a per-pixel basis during scanning. One example provides an optical system including an array of light sources, a holographic light processing stage comprising, for each light source in the array, one or more holograms configured to receive light from the light source and diffract the light, the one or more holograms being selective for a property of the light that varies based upon the light source from which the light is received, and a scanning optical element configured to receive and scan the light from the holographic light processing stage.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
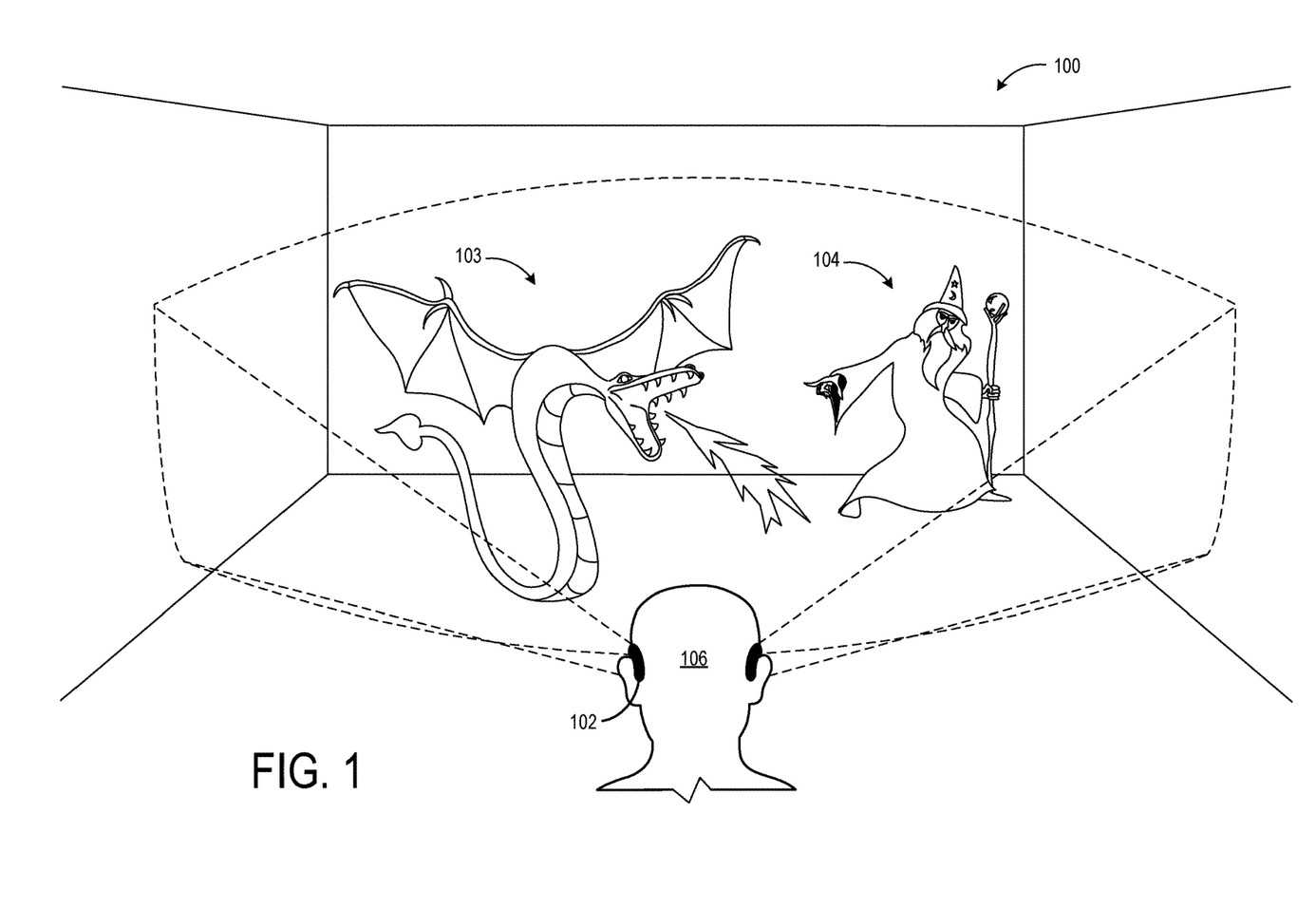
FIG. 1 shows an example use scenario for an augmented reality display device.

Some near-eye displays may utilize a single illumination source and collimating optics to form a collimated beam that is scanned via a scanning optical element onto an image-forming optic (e.g. an eyepiece) for viewing. FIG. 1 shows an example use scenario 100 for a near-eye display in the form of a head-mounted display device 102. Through projection optics, the head-mounted display device 102 may display virtual objects 103 and 104 to appear to a wearer 106 as being superimposed over a real-world background.

However, such projection systems may not allow varying focal distances to be used for displayed imagery. As a result, objects that have a different apparent depth due to stereo differences in left and right eye images are displayed at a same actual focal distance.

One potential solution is to use a variable power lens to adjust optical power as the image is scanned. However, current variable power optical elements may not have fast enough switching speeds to switch focus on a per-pixel basis in a same image. Another potential solution is to use a switchable polarizer in combination with polarizing lenses of different powers. However, such a solution would provide only two different focal distances. In either case, such switchable elements may be bulky and power-consuming.

Accordingly, examples are disclosed of adjustable scanned beam projector systems configured to allow optical characteristics of projected light to be adjusted on a per-pixel basis. Briefly, the disclosed examples utilize an array of individually controllable light sources, and a holographic light processing stage configured to produce different optical characteristics based upon the light source(s) being illuminated. For example, the holographic light processing stage may utilize a volume hologram comprising a plurality of angularly multiplexed holograms, and/or a stack of individual holograms. Each hologram of the holographic light processing stage is selective for a property of the light that varies based upon the light source from which the light is received. Each hologram of the holographic image processing stage may impart a different optical characteristic, such as a different optical power and/or a different aberration correction, to light output by the holographic light processing stage. In this manner, various properties of light can be adjusted on a per-pixel basis merely by controlling which light source is illuminated as that pixel is scanned. Varying optical power would allow, for example, the two virtual objects 103 and 104 shown in FIG. 1 to be displayed at different focal distances. The disclosed examples may be utilized in place of conventional projector optics (e.g. single light source and collimator) in a scanned light display system.

Figure 2:
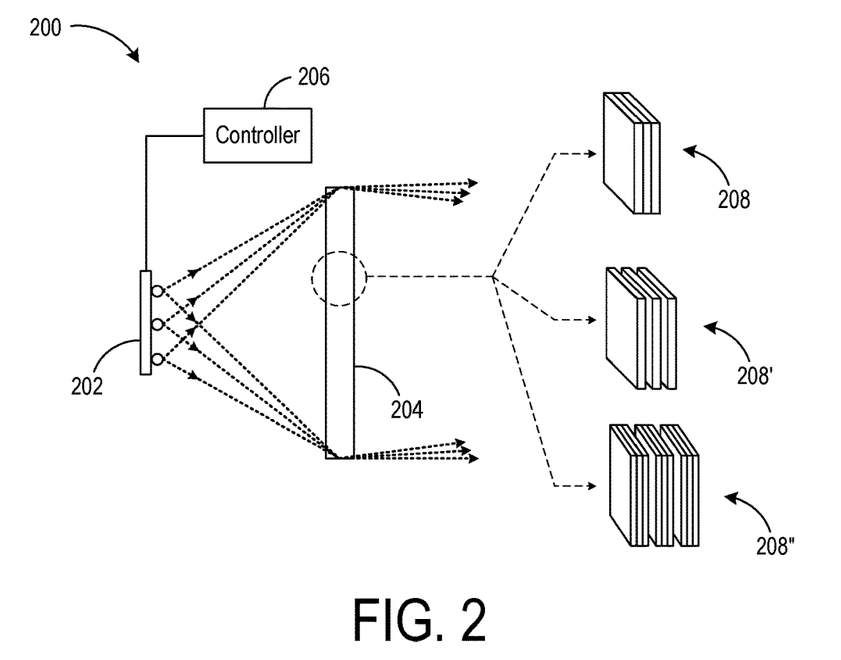
FIG. 2 schematically shows an example of an optical system that may be used in a scanned beam projector system to adjust optical characteristics on a per-pixel basis.

FIG. 2 schematically shows an example of an optical system that may be used in a scanned beam projector system to adjust optical characteristics on a per-pixel basis. Optical system 200 utilizes a light source array 202, such as an array of lasers or light-emitting diodes (LEDs), positioned to provide light to a holographic light processing stage 204. The light source array 202 may take any suitable form. For example, the light source array 202 may comprise a single monolithic die on which the array of light sources is formed, or may comprise an array of individual dies. Further, the light source array may be configured to emit light of a same wavelength, or of more than one wavelength. A controller 206 may be operatively coupled to the light source array 202 to switch each light source on or off and/or adjust the intensity of each light source as light is scanned to form an image.

The holographic light processing stage 204 may take any suitable form. In some examples, the holographic light processing stage 204 may comprise a volume hologram 208 having a plurality of angularly multiplexed holograms, e.g. Bragg gratings, and may be transmissive or reflective. The volume hologram 208 may be made from any suitable material, such as a photopolymer. Each of the multiplexed holograms may be configured to shape a wavefront from a corresponding light source in the array 202 into a new wavefront having a selected optical characteristic, such as a particular optical power or optical correction. In the illustrated example, the volume hologram 208 focuses the light from each light source in the array to an on-axis beam, each with a varying divergence based upon an incidence angle of the light received.

The holograms of such a volume hologram 208 may be configured such that each hologram has a narrow angular range within which it will accept and diffract incident light, and each angular range is associated with a direction at which light is received from a corresponding light source. Thus, when any one of the light sources of the array 202 is turned on, the holographic light processing stage 204 outputs light that is modified based upon the particular characteristics of one or more holograms configured to receive and diffract light from that light source, such that the light passes through other holograms substantially without diffraction This allows the optical properties of light output by the holographic light processing stage to be varied by switching different light sources of the light source array on and off. The switching rate may be much faster than is possible with an active variable optical element, such as a variable power lens. Such a projector system may also help to address vergence-accommodation conflict when using a near-eye display by matching a focal distance of a viewed image to its stereoscopic distance.

Depending upon the number of angularly multiplexed holograms and/or the angular separation of the input acceptance angles of the angularly multiplexed holograms in a volume hologram, crosstalk between holograms of adjacent acceptance angles may arise. This may result in an optical "ghosting" effect. As such, the geometry of the light source array 202 and properties of the volume hologram (e.g. thickness) may be configured to help reduce the risk of such cross-talk.

In other examples, the holographic light processing stage 204 may include, instead of or in addition to angularly multiplexed volume holograms, multiple volume holograms arranged in a stack, as shown at 208'. The use of a hologram stack 210 may help to reduce crosstalk compared to the use of multiplexed holograms in a same layer of material. In yet other examples, the holographic light processing stage 204 may utilize a combination of stacked volume holograms and angularly multiplexed volume holograms, as shown at 208".

In any of the above examples, each hologram may be constructed such that all light output by the holographic light processing stage 204 emerges as on-axis beams, but with varying divergence (or other property) based upon the light source and hologram used to produce the beam. Further, the light sources may be located off-axis to help prevent zero-order light from impacting contrast in a projected image.

Figure 3:
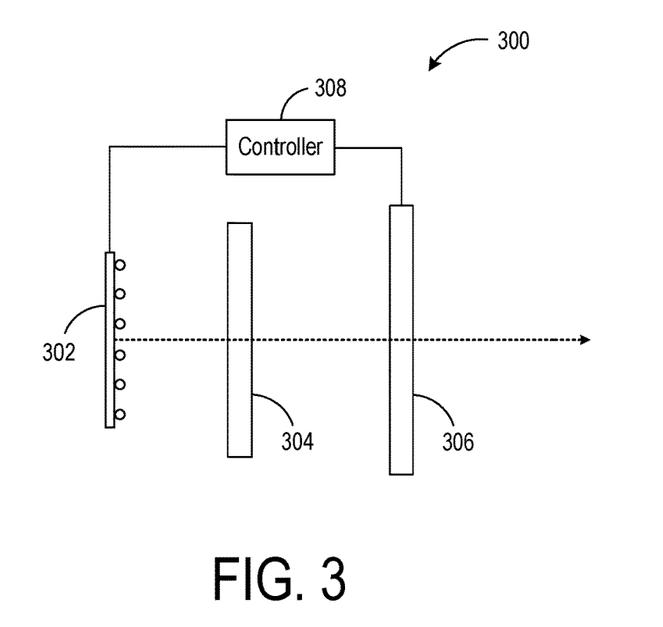
FIG. 3 schematically shows an example optical system comprising an adjustable scanned beam projector system.

The example light source array and holographic light processing stage of FIG. 2 may replace a conventional scanned beam light source and beam shaping optical system. FIG. 3 schematically shows an example optical projector system 300 comprising a light source array 302, a holographic light processing stage 304, a scanning optical element 306, and a controller 308 to control the operation of the light source array 302 and the scanning optical element 306. Any suitable scanning beam scanning element, such as a micro-electromechanical system (MEMS) scanner, acousto-optic modulator (AOM), electro-optical scanner (e.g. a liquid crystal or electrowetting prism array), or a mechanically scannable mirror, prism or lens, may be utilized as the scanning optical element 306. As the image is scanned by scanning optical element 306, one or more of the light sources in the array 302 may be selectively illuminated for each projected pixel to provide per-pixel control over one or more optical properties in the manner described above. In the specific example of holograms with different optical power, where an image to be displayed comprises virtual image elements at different focuses, the depth values associated with the scene (e.g. the Z-buffer in a graphics rasterization pipeline) may be used to select which light source or sources to illuminate for each pixel. Any suitable processing (e.g. quantization) may be performed to map the depth values to the selected light sources. For image elements between two different depths, an interpolation may be employed between the two or more nearest depth values.

The projector 300 also may be used to correct for optical aberrations. For example, the light sources may be associated with a set of holograms that compensate for aberrations over different parts of the image, and light sources may be selectively illuminated as the image is scanned to correct the aberrations across the image.

The projector 300 further may be configured to correct for viewer eye aberrations. For example, a set of predetermined (e.g. common or viewer-customized) aberration-compensating holograms may be associated with the light source array. One or more holograms configured to compensate for viewer eye aberrations may be activated during beam scanning by turning on the corresponding light source(s). As viewer eye aberrations are consistent over time compared to the pixel scanning rate, a slower element, such as a variable hologram (e.g. a phase modulating LCD panel), also may be used to correct for viewer eye aberrations. In some examples, various aspects of the above-described example may be combined. For example, the projector system may present a multi-focal light field while also correcting for viewer eye aberrations.

In some examples, the active light source(s) may be selected dynamically in an active feedback loop based on information from sensors, such as eye or gaze tracking sensors. As a more specific example, in a near-eye display system, the selection of an appropriate aberration compensating hologram may vary based upon the viewer's sensed eye position. Thus, an eye tracking system may provide eye tracking data to a controller, which in turn may illuminate one or more corresponding light sources in the array. In a low-latency system, the projector control unit may adjust the active light source in a just-in-time manner using the latest received eye tracking data. In other examples, predictive methods may be used to determine a likely gaze location, or a combination of just-in-time data and predictive methods may be used. In a similar manner, light sources can also be switched on/off to adjust an image to implement foveated image display, or accommodate to user-specific eye characteristics such as interpupillary distances, eye position, and eye rotation.

As mentioned above, the holograms of a holographic light processing stage may be selectively diffractive based upon properties other than incidence angle. For example, to form a color image, holograms of the holographic light processing stage may selectively diffract based on wavelength(s) of light. In such an example, the optical system 300 may utilize red, green, and blue laser arrays, either spatially separated or interleaved, and corresponding red-diffracting, green-diffracting, and blue-diffracting holograms for each desired optical characteristic, such that three holograms are used to produce each desired optical characteristic (e.g. a red, a green, and a blue-diffracting hologram for a selected optical power). The light output from the holographic light processing stage 304 may then be optically combined into a full color, e.g. RGB, image, or may be displayed as a color field-sequential image.

Figure 4:
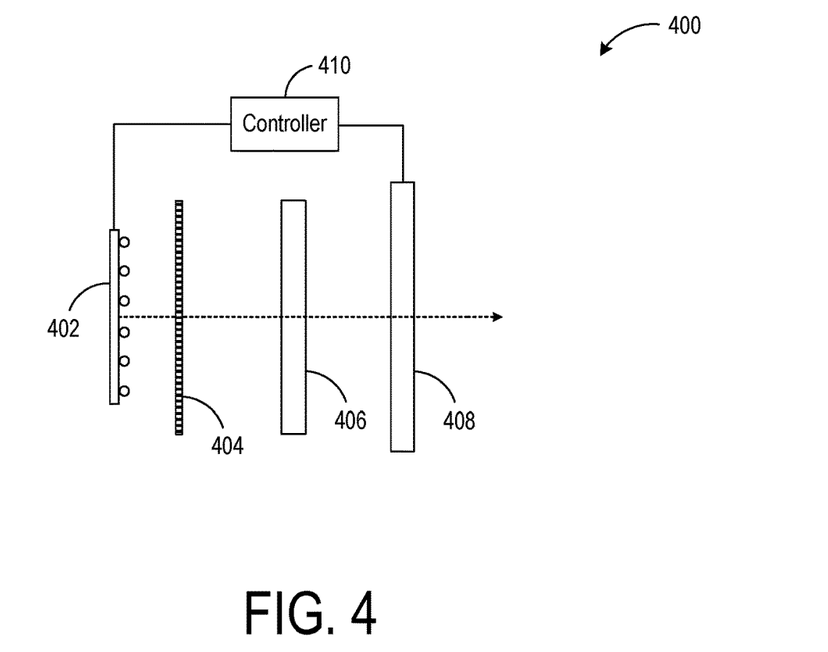
FIG. 4 schematically shows an example optical system comprising an adjustable scanned beam projector system and a polarizing element.

As another example, holograms in the holographic light processing stage may selectively diffract based upon a polarization state of light received from each light source. FIG. 4 schematically shows an example optical system 400 utilizing a light source array 402, a switchable polarizing element 404, a holographic light processing stage 406, a scanning optical element 408, and a controller 410 to control the light source array 402 and the scanning optical element 408 to form an image. The switchable polarizing element 404 allows two different angularly selective or wavelength selective holograms to be used for each light source, thus increasing the range of achievable optical characteristics by a factor of two.

As another example, the light sources in the array 402 may comprise polarizing filters such that each light source emits light of a set polarization state. In such an example, holograms that are both angularly selective and polarization-state selective may be used to modify a light field produced by the system. Further, a switchable polarization-selective element may be positioned downstream of the holographic light processing stage 406, for example, where other optical elements downstream are polarization-sensitive and where it is thus desired to provide light of a same polarization state regardless of the polarization state of light input to the holographic light processing stage.

Figure 5:
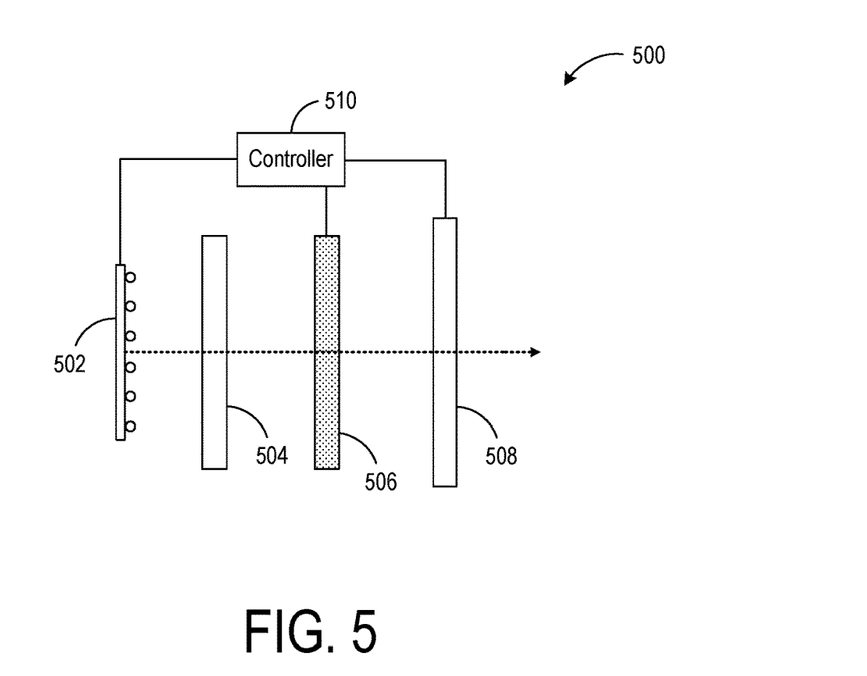
FIG. 5 schematically shows an example optical system comprising an adjustable scanned beam projector system and a switchable hologram.

As described above, a scanning optical system may utilize one or more variable optical elements, such as variable power lenses or switchable holograms. FIG. 5 schematically shows an example optical system 500 including a light source array 502, a holographic light processing stage 504, a switchable hologram 506 placed upstream of a scanning optical element 508, and a controller 510 for controlling the light source array 502, the switchable hologram 506, and the scanning optical element 508. The switchable hologram, while relatively slower-acting, may provide for additional possible beam states when combined with holographic light processing stage. The switchable hologram may thus be used to switch between optical states for aspects that can be more slowly addressed. e.g. coordinating with viewer eye movement or switching between larger focal distance ranges, while the holographic light processing stage may be used to switch between states on a faster basis, e.g. per-pixel.

As a more specific example, the switchable hologram may be configured to adjust a projected image based upon on eye position. As the eye focuses from one plane to another in a viewed scene, some dwell time is necessary to refocus the eyes on the different image plane. Thus, the slower-response switchable hologram may be used in combination with an eye tracking system (not shown) to apply variable accommodation. This may be used to switch between larger focal distance ranges, while the light source array and corresponding holographic light processing stage may be used to switch between available focal distances within a range set by the variable power element. In such an example, one light source from the array and a corresponding hologram may provide a focal power that focuses an image pixel at one meter of distance at a first switchable hologram setting, while the same light source and corresponding hologram may provide a focal power that focuses at two meters at a second switchable hologram setting. The switchable hologram 506 may take any suitable form, including but not limited to a computer-generated hologram in a phase-modulating panel (reflective or transmissive), or a static hologram electrically switchable by liquid crystal rotation. Further, other variable power technologies may be used, such as variable power lenses. Such technologies may allow for the variation of optical power, but may not provide for aberration correction, whereas a variable hologram may be configured to correct aberrations as well as to vary optical power. Example variable power lens technologies include electrowetting lenses, liquid-filled capillary systems, MEMS-based piezo-actuators, and push-pull surfaces.

In some examples, the switchable hologram 506 may further apply a user's eyeglass prescription. For example, in a fully virtual reality scenario, a system may compensate for a user's poor eyesight by a light field output by the holographic light processing stage 504 based upon the eyeglass prescription, and displaying the modified light field as a "corrected" virtual image for viewing. In other examples, a display system may include a corrective lens customized to the user's eyeglass prescription.

It will be understood that the adjustable projector unit described above may be combined with any other suitable optical components, including but not limited to optical relays, eyepieces, pupil steering elements, pupil replication elements, etc. to create a light field or vision correcting display system.

Figure 6:
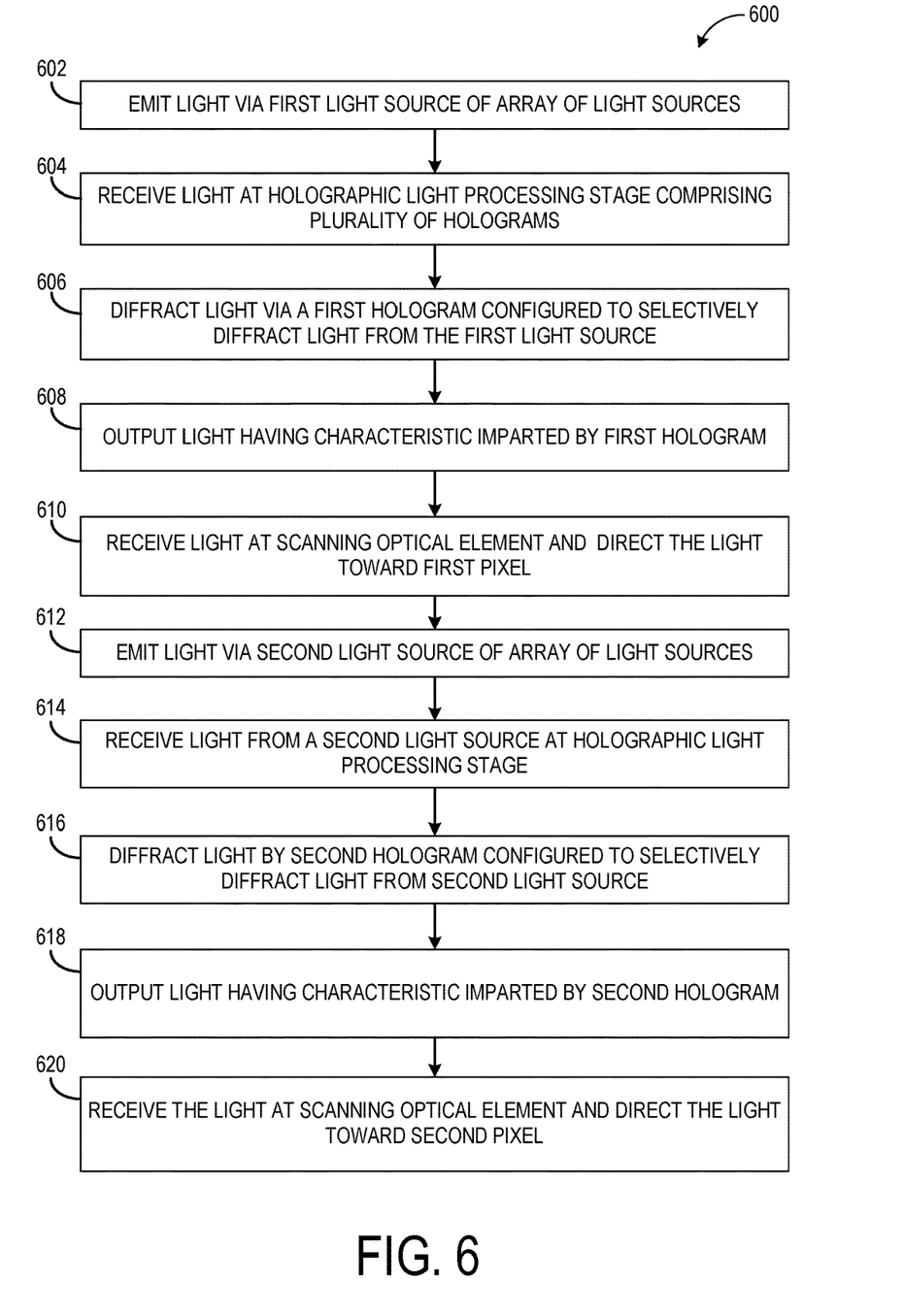
FIG. 6 shows a flowchart depicting an example method of controlling a light field on a per-pixel basis.

FIG. 6 shows an example method 600 of controlling light on a per-pixel basis for forming an image via a display system. Method 600 includes, at 602, emitting light from a first light source in an array of light sources. Method 600 further includes, at 604, receiving the light emitted by the first light source at a holographic light processing stage. As described above, the holographic light processing stage may take any suitable form, including but not limited to a volume hologram having a plurality of angularly multiplexed holograms, a stack of holograms, or a combination of volume and stacked holograms. Each hologram in the holographic light processing stage is configured to be selective for one or more properties of light, such as angle, wavelength, and/or polarization state, emitted by a corresponding light source of the light source array. Thus, at 606, light from the first light source is diffracted by a corresponding first hologram in the holographic light processing stage, and substantially not diffracted by a second hologram in the holographic light processing stage that is not selective to light from that light source. The light from the first light source as diffracted by the holographic light processing stage has an optical characteristic, such as an optical power or aberration correction characteristic, imparted by the first hologram. The light with the characteristic imparted by the first hologram is output by the holographic light processing stage, at 608, to a scanning optical element, where it is received and directed toward a first pixel of the image, at 610.

Method 600 further includes, at 612, emitting light from a second light source in an array of light sources, and at 614, receiving the light emitted by the second light source at the holographic light processing stage. As shown at 616, light from the second light source is diffracted by a corresponding second hologram in the holographic light processing stage, and substantially not diffracted by the first hologram in the holographic light processing stage. The light from the second light source as diffracted by the holographic light processing stage has an optical characteristic, such as an optical power or aberration correction characteristic, imparted by the second hologram that is different than that imparted by the first hologram. The light having the characteristic imparted by the second hologram is output by the holographic light processing stage at 618. This light is received at the scanning optical element and directed toward a second pixel of the image by the scanning optical element at 620, thereby providing a different optical characteristic to the second pixel than to the first pixel. The optical characteristics of other pixels may be similarly adjusted, thereby allowing per-pixel control of the optical characteristics of the projected image. Further, in some examples, multiple light sources may be activated for each pixel, for example, to display two or more transparent images superimposed on one another, each at a selected focal depth. As such, the method may optionally comprise illuminating the second light source while illuminating the first light source, such that light diffracted by the first hologram and light diffracted by the second hologram are directed toward the first pixel.

Figure 7:
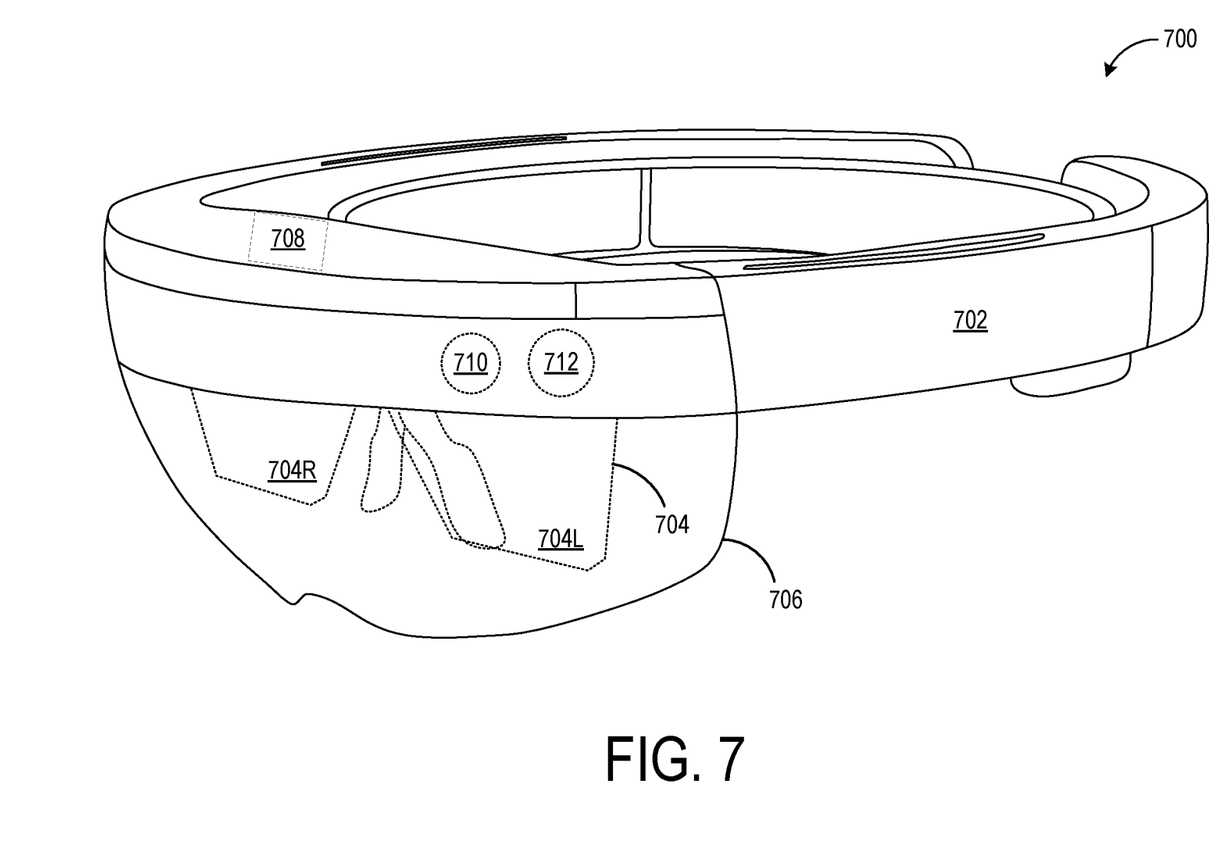
FIG. 7 shows an example head-mounted display system.

FIG. 7 shows an example optical system in the form of a head-mounted display device 700 that may utilize an adjustable scanned beam projector for image generation. Head-mounted display device 700 includes a frame 702 in the form of a band wearable around a head of user that supports see-through display componentry positioned near the user's eyes. Head-mounted display device 700 may utilize augmented reality technologies to enable simultaneous viewing of virtual display imagery and a real world background. As such, head-mounted display device 700 is configured to generate virtual images via see-through display 704. Head-mounted display device 700 as depicted includes separate right and left eye displays 704R and 704L, which may be wholly or partially transparent. In other examples, a see-through display may have a single display viewable with both eyes. See-through display 704 may take any suitable form, such as a waveguide or prism configured to receive a generated image and direct the image towards a wearer's eye. See-through display device 704 may include any suitable light source for generating images, such as one or more laser diodes. Such light sources may be arranged as point source(s), or as an array.

Head-mounted display device 700 further includes an additional see-through optical component 706, shown in FIG. 7 in the form of a see-through veil positioned between see-through display 704 and the background environment as viewed by a wearer. A controller 708 is operatively coupled to see-through optical component 704 and to other display componentry. Controller 708 includes one or more logic devices and one or more computer memory devices storing instructions executable by the logic device(s) to enact functionalities of the display device. Head-mounted display device 700 may further include various other components, for example a two-dimensional image camera 710 (e.g. a visible light camera and/or infrared camera) and a depth camera 712, as well as other components that are not shown, including but not limited to eye-gaze detection systems (e.g. one or more light sources and eye-facing cameras), speakers, microphones, accelerometers, gyroscopes, magnetometers, temperature sensors, touch sensors, biometric sensors, other image sensors, energy-storage components (e.g. battery), a communication facility, a GPS receiver, etc.

It will be understood that although discussed herein in the context of near-eye displays and head-mounted display devices, the disclosed adjustable projector system may be utilized in any other suitable display device, including but not limited to 3D televisions, head-up displays (e.g. in vehicles, airplanes), and other projector-based display systems (e.g. military sand tables).

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
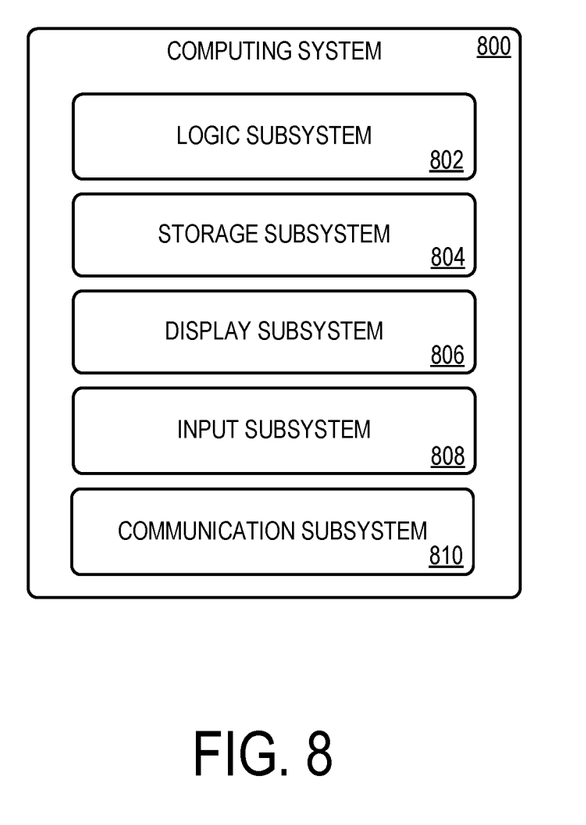
FIG. 8 shows a block diagram of an example computing system.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic subsystem 802 and a storage subsystem 804. Computing system 800 may optionally include a display subsystem 806, input subsystem 808, communication subsystem 810, and/or other components not shown in FIG. 8.

Logic subsystem 802 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 802 may include one or more processors configured to execute software instructions. Additionally or alternatively, the subsystem 802 may include one or more hardware or firmware logic machines configured to execute hardware or firmware instructions. Processors of the logic subsystem 802 may be single-core or multi-core, and the instructions executed thereon may be configured for sequential, parallel, and/or distributed processing. Individual components of the logic subsystem 802 optionally may be distributed among two or more separate devices, which may be remotely located and/or configured for coordinated processing. Aspects of the logic subsystem 802 may be virtualized and executed by remotely accessible, networked computing devices configured in a cloud-computing configuration.

Storage subsystem 804 includes one or more physical devices configured to hold instructions executable by the logic machine to implement the methods and processes described herein. When such methods and processes are implemented, the state of storage subsystem 804 may be transformed—e.g., to hold different data.

Storage subsystem 804 may include removable and/or built-in devices. Storage subsystem 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 804 may include volatile, nonvolatile, dynamic, static, read/write, read-only, random-access, sequential-access, location-addressable, file-addressable, and/or content-addressable devices.

It will be appreciated that storage subsystem 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 802 and storage subsystem 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 806 may be used to present a visual representation of data held by storage subsystem 804. This visual representation may take the form of a graphical user interface (GUI). As the herein described methods and processes change the data held by the storage subsystem 804, and thus transform the state of the storage subsystem 804, the state of display subsystem 806 may likewise be transformed to visually represent changes in the underlying data. Display subsystem 806 may include one or more display devices utilizing virtually any type of technology. Such display devices may be combined with logic subsystem 802 and/or storage subsystem 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

Another example provides an optical system comprising an array of light sources, a holographic light processing stage comprising, for each light source in the array, one or more holograms configured to receive light from the light source and diffract the light, the one or more holograms being selective for a property of the light that varies based upon the light source from which the light is received, and a scanning optical element configured to receive and scan the light from the holographic light processing stage. The holographic light processing stage may additionally or alternatively be configured to vary an optical power of the light received from each light source based upon an angle of the light received from the light source. The holographic light processing stage may additionally or alternatively be configured to correct one or more optical aberrations based upon an angle of the light received from the light sources. The holographic light processing stage may additionally or alternatively include a volume hologram. The holographic light processing stage may additionally or alternatively include a plurality of stacked holograms. The optical system may additionally or alternatively include one or more of a switchable hologram and a variable power optical element. The optical system may additionally or alternatively include a switchable polarizing element configured to receive the light from the array of light sources and output the light to the holographic light processing stage. Two or more light sources of the array of light sources may additionally or alternatively be configured to emit light of different wavelengths, and the holographic light processing stage may additionally or alternatively be wavelength selective. Two or more light sources of the array of light sources may additionally or alternatively be configured to output light of different polarizations. The optical system may additionally or alternatively include a controller configured to control the array of light sources and the scanning optical element to vary a property of light output by the holographic light processing stage on a per-pixel basis. The optical system may additionally or alternatively include an eye tracking unit configured to provide eye tracking data, and the holographic light processing stage may additionally or alternatively be configured to correct aberrations based upon the eye-tracking data.

Another example provides a holographic light processing structure, comprising a plurality of holograms each configured to diffract light received from a corresponding angle, two or more of the holograms being configured to diffract light received from different corresponding angles, and each hologram being configured to selectively impart a different optical characteristic on light for output by the holographic light processing structure. The optical characteristic may additionally or alternatively include an optical power. The optical characteristic may additionally or alternatively include an optical aberration correction. The plurality of holograms may additionally or alternatively include one or more of a volume hologram and a plurality of stacked holograms.

Another example provides a method of controlling a light field on a per-pixel basis, the method comprising emitting light via a first light source of an array of light sources, receiving the light from the first light source at a holographic light processing stage comprising a plurality of holograms, a first hologram of the plurality of holograms being configured to selectively diffract light from the first light source, outputting light from the first light source diffracted by the first hologram, receiving the light from the first light source at a scanning optical element and scanning the light to direct the light toward a first pixel, emitting light via a second light source of the array of light sources, receiving the light from the second light source at the holographic light processing stage, a second hologram of the plurality of holograms being configured to selectively diffract light from the second light source, outputting the light from the second light source diffracted by the second hologram differently than the light from the first light source, and receiving the light from the second light source at the scanning optical element and scanning the light to direct the light toward a second pixel. The first hologram and the second hologram may additionally or alternatively have different optical powers. The method may additionally or alternatively include illuminating the second light source while illuminating the first light source, such that light diffracted by the first hologram and light diffracted by the second hologram are directed toward the first pixel. The method may additionally or alternatively include illuminating the first light source and the second light source at different intensities to control a balance of optical properties of the first light source and the second lights source at the first pixel. The method may additionally or alternatively include controlling the array of light sources and the scanning optical element to vary a property of light output by the holographic light processing stage on a per-pixel basis.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An optical system, comprising
an array of light sources;
a holographic light processing stage comprising, for each light source in the array, one or more holograms configured to receive light from the light source and diffract the light, the one or more holograms being selective for a property of the light that varies based upon the light source from which the light is received, and
a scanning optical element configured to receive and scan the light from the holographic light processing stage.

2. The optical system of claim 1, wherein the holographic light processing stage is configured to vary an optical power of the light received from each light source based upon an angle of the light received from the light source.

3. The optical system of claim 1, wherein the holographic light processing stage is configured to correct one or more optical aberrations based upon an angle of the light received from the light sources.

4. The optical system of claim 1, wherein the holographic light processing stage comprises a volume hologram.

5. The optical system of claim 1, wherein the holographic light processing stage comprises a plurality of stacked holograms.

6. The optical system of claim 1, further comprising one or more of a switchable hologram and a variable power optical element.

7. The optical system of claim 1, further comprising a switchable polarizing element configured to receive the light from the array of light sources and output the light to the holographic light processing stage.

8. The optical system of claim 1, wherein two or more light sources of the array of light sources are configured to emit light of different wavelengths, and wherein the holographic light processing stage is wavelength selective.

9. The optical system of claim 1, wherein two or more light sources of the light source array are configured to output light of different polarizations.

10. The optical system of claim 1, further comprising a controller configured to control the array of light sources and the scanning optical element to vary a property of light output by the holographic light processing stage on a per-pixel basis.

11. The optical system of claim 1, further comprising an eye tracking unit configured to provide eye tracking data, and wherein the holographic light processing stage is configured to correct aberrations based upon the eye-tracking data.

12. A holographic light processing structure, comprising a plurality of holograms each configured to diffract light received from a corresponding angle, two or more of the holograms being configured to diffract light received from different corresponding angles, and each hologram being configured to selectively impart a different optical characteristic on light for output by the holographic light processing structure.

13. The holographic light processing structure of claim 12, wherein the optical characteristic comprises an optical power.

14. The holographic light processing structure of claim 12, wherein the optical characteristic comprises an optical aberration correction.

15. The holographic light processing structure of claim 12, wherein the plurality of holograms comprises one or more of a volume hologram and a plurality of stacked holograms.

16. A method of controlling a light field on a per-pixel basis, the method comprising:
emitting light via a first light source of an array of light sources;
receiving the light from the first light source at a holographic light processing stage comprising a plurality of holograms, a first hologram of the plurality of holograms being configured to selectively diffract light from the first light source;
outputting light from the first light source diffracted by the first hologram;
receiving the light from the first light source at a scanning optical element and scanning the light to direct the light toward a first pixel;
emitting light via a second light source of the array of light sources;
receiving the light from the second light source at the holographic light processing stage, a second hologram of the plurality of holograms being configured to selectively diffract light from the second light source;
outputting the light from the second light source diffracted by the second hologram differently than the light from the first light source; and
receiving the light from the second light source at the scanning optical element and scanning the light to direct the light toward a second pixel.

17. The method of claim 16, wherein the first hologram and the second hologram have different optical powers.

18. The method of claim 16, further comprising illuminating the second light source while illuminating the first light source, such that light diffracted by the first hologram and light diffracted by the second hologram are directed toward the first pixel.

19. The method of claim 18, further comprising illuminating the first light source and the second light source at different intensities to control a balance of optical properties of the first light source and the second lights source at the first pixel.

20. The method of claim 16, further comprising controlling the array of light sources and the scanning optical element to vary a property of light output by the holographic light processing stage on a per-pixel basis.

* * * * *